United States Patent
Reyes et al.

(10) Patent No.: US 6,992,271 B2
(45) Date of Patent: Jan. 31, 2006

(54) HEATING ELEMENT AND ELECTRIC TOASTER WITH THERMAL INSULATION

(75) Inventors: Lionel Reyes, Remiremont (FR); Michel Klinger, Stosswihr (FR); Jean-Marie Balandier, Talant (FR); Guy Mauffrey, Breuchotte (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 10/780,894

(22) Filed: Feb. 19, 2004

(65) Prior Publication Data

US 2004/0222215 A1 Nov. 11, 2004

(30) Foreign Application Priority Data

Feb. 19, 2003 (FR) .................................. 03 02042

(51) Int. Cl.
*H05B 3/06* (2006.01)
(52) U.S. Cl. ...................................................... 219/521
(58) Field of Classification Search ................ 219/521, 219/385–386; 99/334, 385, 392
See application file for complete search history.

(56) References Cited

U.S. PATENT DOCUMENTS

| 2,669,925 | A | | 2/1954 | Laylon et al. |
| 2,779,850 | A | | 1/1957 | Gomersall |
| 4,396,825 | A | * | 8/1983 | Cox et al. .................... 219/521 |
| 5,126,534 | A | * | 6/1992 | Kwong ........................ 219/386 |
| 5,642,657 | A | * | 7/1997 | Yeung et al. ................. 99/334 |
| 5,644,974 | A | * | 7/1997 | Slavin ......................... 99/328 |
| 6,205,910 | B1 | * | 3/2001 | Vaughn ....................... 99/326 |
| 6,297,477 | B1 | * | 10/2001 | Gort-Barten et al. ........ 219/386 |
| 6,417,492 | B1 | * | 7/2002 | Gort-Barten et al. ........ 219/385 |
| 6,854,380 | B2 | * | 2/2005 | Wanat .......................... 99/400 |

FOREIGN PATENT DOCUMENTS

FR 1596661 7/1970
FR 2175783 10/1973

* cited by examiner

*Primary Examiner*—Robin O. Evans
*Assistant Examiner*—Vinod Patel
(74) *Attorney, Agent, or Firm*—Browdy and Neimark, PLLC

(57) ABSTRACT

A heating element composed of at least one mica sheet and a heating ribbon, or strip, mounted on the sheet, a support device holding the mica sheet and constituting a first reflector, and a plate secured to the support device and constituting a second reflector. An electric toaster composed of a base, a case having an upper end, a toasting chamber disposed in the case and having an opening in the form of a slot at the upper end for the introduction and removal of bread, a movable bread support rack in the chamber, and at least one substantially vertical heating element as described above.

17 Claims, 3 Drawing Sheets

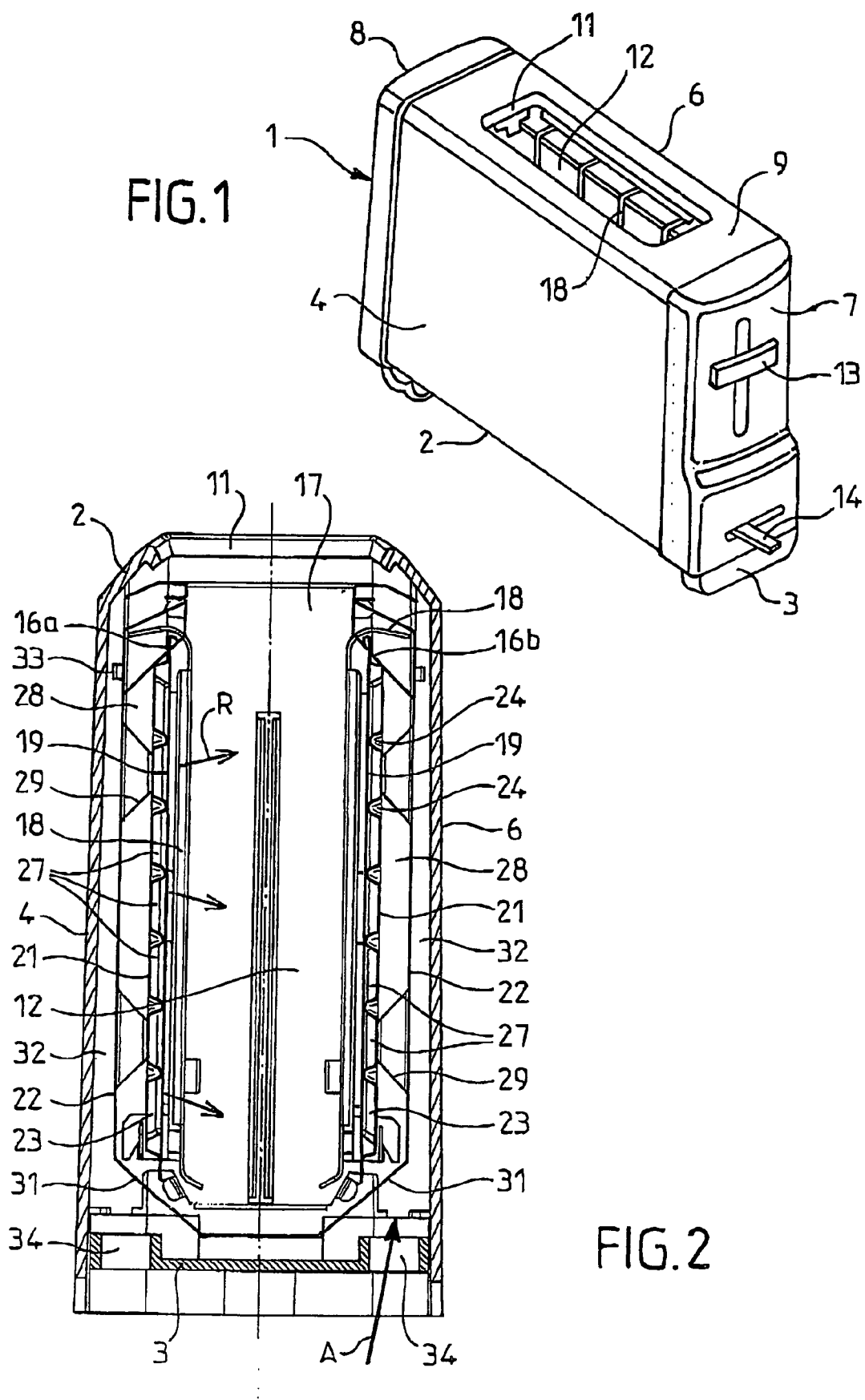

HEATING ELEMENT AND ELECTRIC TOASTER WITH THERMAL INSULATION

BACKGROUND OF THE INVENTION

The present invention relates to thermally insulated heating elements. The invention is also directed to improvements in electric toasters with regard to thermal insulation of the wall of the exterior housing, or case.

The usual electric toaster includes an outer case and a toasting chamber that contains a movable bread rack that supports bread slices during toasting. Careful attention must be paid to safety conditions, particularly concerning the risk to users of sustaining burns as a result of possibly touching the outer case. There is also a trend toward toasters having ever smaller dimensions while being capable of operating at high power levels.

While the internal dimensions of the toasting chamber are fixed and determined as a function of the size of the different slices of bread to be toasted, the dimensions of the related heating elements can be varied. In general terms, a toaster has heating means that can function either by radiation or by conduction.

In the case of radiation, the bread to be toasted is brought opposite radiating heating elements and thus receives the quantity of energy necessary for toasting. In the case of heating by conduction, the bread to be toasted is brought into contact with the elements for heating by conduction during a time necessary to obtain satisfactory toasting. In both cases, two main heating elements are presently used, in the form of resistive heating elements with or without a quartz tube and in the form of heating elements composed of resistance strips, or ribbons.

French patent document FR 2175783 describes a toaster having heating elements constituted by sheets of mica on which resistive ribbons are wound, located at both sides of the toasting chamber. Between the mica sheets and the outer case, there are disposed reflectors and/or insulating elements that constitute a protective screen with the respect to the outer case.

This compact form of construction for the heating elements does not, however, guarantee a good thermal insulation because the rear faces of the mica sheets radiate to a substantial extent in the direction of the reflector and the outer case. The reflector plays its role by reflecting a part of the radiation, but it also is heated and transmits, in turn, a part of the radiation toward the outer case. Added to these thermal phenomena are convection flows existing between the mica sheets and the reflector, as well as between the reflector and the outer case. This can lead to a substantial heating of the outer case unless a substantial spacing is provided between the case and the reflectors. As a result, a toaster of this type is not particularly compact.

A second known toaster, marketed by the company Taurus under the product name My Toast®, has two heating elements constituted by resistive ribbons placed between two mica sheets, situated at both sides of the toasting chamber. This toaster has, in succession and when viewed in cross-section, from the center of the toasting chamber: a grid, a first thin mica sheet, a second, thicker, mica sheet wound with the resistive ribbon, a sheet metal reflector and an outer case made of plastic. A metal roof is provided so that the outer case need not be curved to extend over the top of the toaster, which is normally the hottest zone.

However, this form of construction does not permit insulation of the toasting chamber or reduction of the temperature of the outer walls.

The patent document FR 1596661 describes a toaster having a case composed of two distinct parts, composed of an outer part and an inner part that are fitted together in a manner to provide therebetween a space in which air circulates by convection to cool the wall of the outer part.

However, the additional volume of the outer part and the air circulation space serve to increase the overall size of the toaster.

BRIEF SUMMARY OF THE INVENTION

The present invention provides an improved heating element that can be installed within any type of toaster.

The invention further provides a toaster having a good thermal insulation with respect to the outer case, with a reduced overall size and a modest additional cost.

The invention further provides a compact toaster that more reliably protects users against burns.

The invention also serves to improve the efficiency of heating elements of a toaster and particularly the relation between desired toasting time and required power, allowing a reduction in either one or both of toasting time and energy.

The invention makes use of a heating element having at least one mica sheet on which a heating ribbon, or strip, is formed.

According to one aspect of the invention, the heating element also includes:

a support device intended to hold the mica sheet or sheets and to form a first reflector; and a plate secured to the support device and provided to form a second reflector.

Stated in other terms, the presence of two reflectors permits, in a minimum space, reducing the temperature at the back of the heating element. Thermal losses are reduced, which permits installing such a heating element in a toaster. The resulting toaster will thus require a lower level of electric power with respect to known toasters, while achieving the same bread toasting quality.

Preferably, the support device can be separated from the mica sheet or sheets by a first space. The support device can advantageously have one or more projections coming in contact with the mica sheet or sheets and defining the thickness of the first space. The projection or projections can be in the form of longitudinal ribs. These ribs can form at least two distinct substantially closed volumes situated at the interior of the first space. These volumes constitute separated pockets, or cells, of isolated hot air, which prevent convection between the mica sheet or sheets and the support device.

The plate can be separated from the support device by a second space. The plate can have one or several enlargements, or projecting parts, coming in contact with the support device. The enlargement or enlargements can define the thickness of the second space and can form a substantially closed volume located at the interior of the second space. This volume constitutes a separated pocket, or cell, of isolated air, which prevents convection between the support device and the plate. Thus, heat for toasting the bread can be transmitted essentially by thermal radiation without convection heat.

Preferably, the zones of contact will be minimized in order to reduce the heat transmitted by conduction.

The support device and the plate can be made of stamped and bent sheet metal and/or with surface treatment, and can have good heat reflection properties.

The invention further provides, according to a second aspect, an electric toaster having a base, a case, a toasting chamber having an opening in the form of a slot for the introduction and removal of bread and including a movable bread support rack, and at least one substantially vertical heating element such as described above.

The case can be separated from the plate of the heating element by a third space. This third space can form an open volume at the level of its upper end directed toward the slot for receiving bread to be toasted. The plate can include, optionally, one or several spacers that come in contact with the case.

The base can have one or several air inlet openings that can communicate with the third space. This permits an aspiration of cool air between the case and the plate, which further cools this space and thus limits the heating of the case.

BRIEF DESCRIPTION OF THE DRAWINGS

FIG. 1 is a perspective view of a toaster that can be constructed according to the invention.

FIG. 2 is a cross-sectional view in a vertical plane through FIG. 1 showing features of one embodiment of a heating element and a toaster according to the invention.

DETAILED DESCRIPTION OF THE INVENTION

Figure 3:
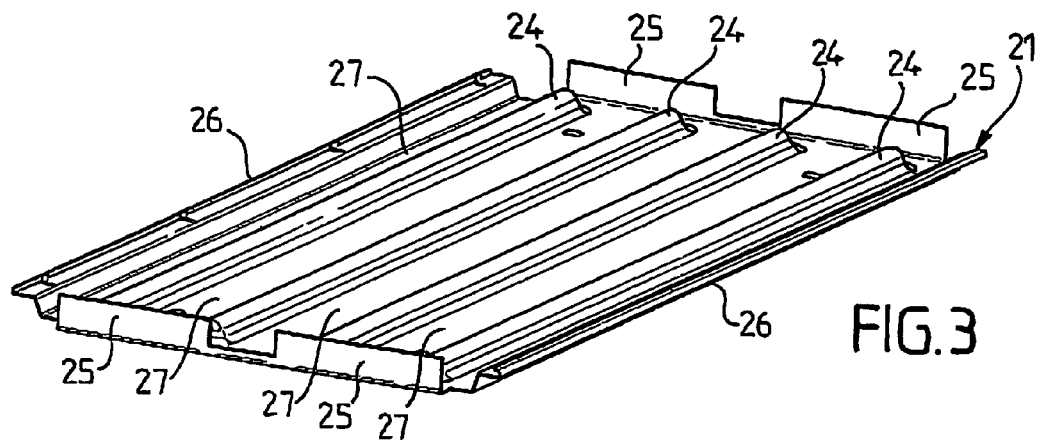
FIG. 3 is a perspective view of a stiffening element forming a first reflector of the embodiment shown in FIG. 2.

FIG. 1 shows a toaster 1 that includes an outer housing in the form of an outer case 2 supported on a base 3. Outer case 2 has five sides, two large lateral sides 4,6, two smaller end sides 7,8 and a top, or roof, 9.

In the upper side 9 of outer case 2 there is provided a slot 11 for the introduction and removal of bread to be toasted. This slot 11 gives access to an underlying toasting chamber 12 that has a conventional movable bread support rack (not shown) dimensioned and configured to support the weight of bread that is to be toasted while minimizing the accumulation of crumbs.

In one of the smaller end sides 7 there are provided conventional manual means for lowering the bread rack, and thus the bread to be toasted, into the interior of toasting chamber 12, and conventional means for regulating the degree of toasting desired.

As can be seen most clearly in FIG. 2, two heating elements 16a,16b are oriented vertically at the interior of toasting chamber 12 and chamber 12 is closed at its two ends by lateral uprights 17.

Each of heating elements 16a,16b includes a grid 18 that will contact bread being toasted and that is intended to prevent the bread from being charred by contact with the heat radiating parts. In certain embodiments, grids 18 could be mounted in a manner to pivot toward one another in order to center the bread with respect to the heating elements. The heat radiating parts of each heating element include a mica sheet 19 on whose surface is deposited or attached a heating ribbon or strip (not visible in the figures). The ribbon can be configured in a pattern and applied in ways already known in the field.

According to the invention, each heating element includes a support device 21, also referred to as a stiffener, interposed between mica sheet 19 and outer case 2. Stiffener 21 is intended to support mica sheet 19 and to form a first reflector. According to the invention, each heating element further includes a plate 22 interposed between support device 21 and outer case 2. Plate 22 is intended to form a second reflector.

Stiffener 21 is generally in the form of a substantially flat plate and is spaced from mica sheet 19 by a first space 23. Stiffener 21 has a plurality of projections 24 extending from its front face, i.e. that which faces mica sheet 19, and coming in contact with the rear face of mica sheet 19. Stiffener 21 has four lateral folded over portions 25 extending from its front face and oriented toward mica sheet 19, and also has two longitudinal edges 26 extending from its front face and equally oriented toward mica sheet 19, all as shown most clearly in FIG. 3. Longitudinal edges 26 are bent over to form grooves that serve to maintain and anchor mica sheet 19.

Projections 24 have a predetermined height and serve to define the thickness of first space 23. Projections 24 are, in this embodiment, constituted by horizontal longitudinal ribs that form between one another and with lateral folded portions 25 and longitudinal edges 26, several distinct closed volumes 27 disposed at the interior of first space 23. In the embodiment shown in FIG. 2, stiffener 21 is provided with six projections 24. In the somewhat modified embodiment shown in FIGS. 3 and 4, stiffener 21 has four projections 24. Of course, the number of projections can vary from those illustrated.

The distinct volumes 27 are regularly distributed across the front face of stiffener 21, extending from one folded over portion 25 to an opposing folded over portion 25, in a manner to be spaced apart vertically between the top and the bottom of a toaster equipped with stiffener 21.

Figure 5:
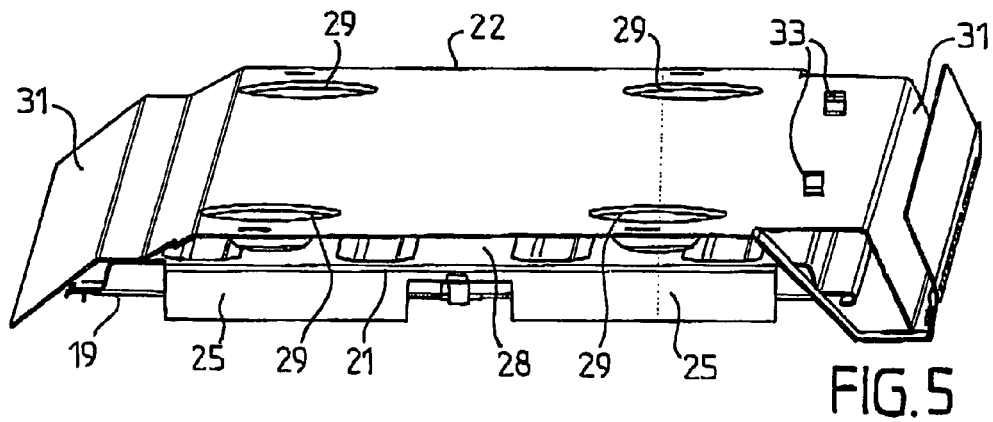
FIG. 5 is a perspective view of a heating element of the embodiment of FIG. 2.

In the embodiment shown in FIG. 2, the six projections 24 and the two longitudinal edges 26 form seven distinct volumes 27. In the embodiment of FIGS. 3 and 5, the four projections and the two longitudinal edges 26 form five distinct volumes 27. According to an optional form of construction, first space 23 or one or several of distinct volumes 27 can be filled with a thermal insulating material, for example in the form of a mineral foam or equivalent material.

Figure 4:
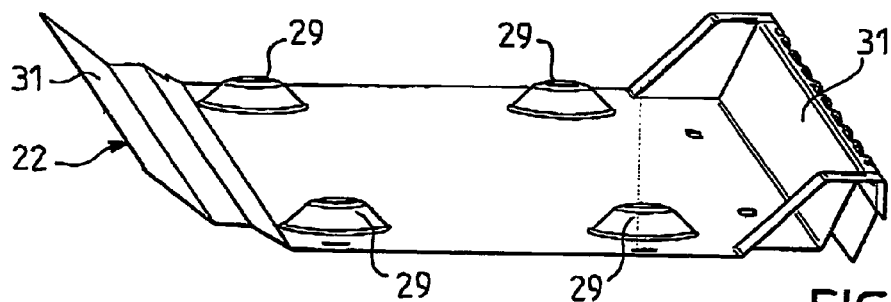
FIG. 4 is a perspective view of a second reflector of the embodiment of FIG. 2.
Figure 6:
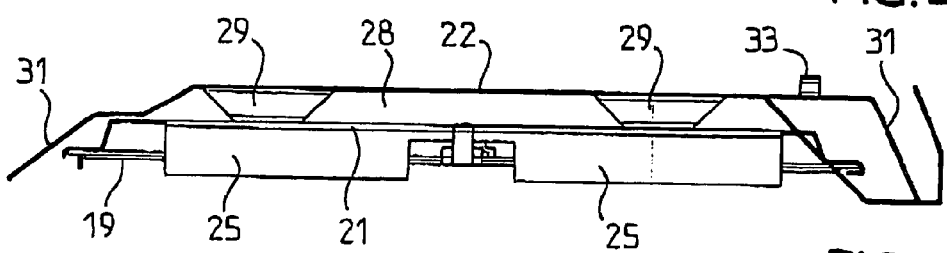
FIG. 6 is a side view of the heating element shown in FIG. 5.

Second reflector 22 is separated from stiffener 21 by a second space 28. Second reflector 22 has several enlargements, or protuberances, 29 extending from its front face, which is directed toward stiffener 21, and coming in contact with the rear face of stiffener 21. Second reflector 22 also has two longitudinal edges extending from its front face and oriented toward stiffener 21. As can be seen in FIGS. 4–6, the two longitudinal edges have respectively different forms.

Protuberances 29 have a predetermined height that defines the thickness of second space 28. Protuberances 29 are essentially in the form of conic frusta and are distributed regularly across the front face of second reflector 22. In the form of construction shown in FIGS. 3 and 4, reflector 22 has four protuberances 29 substantially at the four corners of reflector 22. Longitudinal edges 31 and protuberances 29 establish a substantially closed volume within second space 28.

In an alternative form of construction, a second space 28, or the closed volume defined by that space, is filled with a thermal insulating material, for example in the form of a mineral foam or equivalent material.

By the positioning of heating elements 16a,16b within outer case 2, second reflector 22 is separated from outer case 2 by a third space 32 that forms an open volume at the level of its upper end, in the direction of slot 11.

Second reflector 22 has two spacers 33 extending from its rear face and arranged to come in contact with the inner face of outer case 2. Base 3 is provided with two openings 34, each located below a respective heating element 16a,16b, and each communicating with a respective third space 32.

Stiffener 21 and second reflector 22 are made of stamped and bent sheet metal having good thermal reflecting properties. One longitudinal edge 31 of each reflector 22 is disposed near the upper end of the toaster and has a form that is optimized in particular to provide thermal protection of outer case 2 around bread introduction slot 11.

A toaster having the form shown in FIGS. 1–6 is utilized in the following manner. At the beginning of a toasting cycle, bread is introduced into toasting chamber 12, between grids 18. The bread rack is lowered by the user with the aid of manual means 13, which initiates the supply of electric power to heating elements 16a,16b and the retention of bread in toasting chamber 12.

The resistive ribbon, or ribbons, dissipate heat by radiation, as indicated by arrows R in FIG. 2, in all directions. Two types of heat transfer take place concurrently: direct radiation from all of the heating elements whose temperature progressively increases; and convection movement of air in proximity to heating elements 16a,16b.

The heat exchanges by radiation are characterized mainly by the surface state of the materials utilized which are thus selected for their thermal reflectivity. Specific surface treatments can be applied to stiffener 21 and to second reflector 22 in order to minimize the thermal emissivity of the rear faces of the reflectors, i.e. the faces that are directed away from chamber 12, and in order to increase the reflection from their front faces.

The heat exchanges by convection are characterized mainly by the geometry of toaster 1. The different air volumes 27,28,32 between the heat generating parts and case 2 can be designed to minimize heating of case 2. On the one hand, case 2 is ventilated with cool air entering through openings 34. On the other hand, exchanges by convection between reflector 22 and the heat generating members are limited. Heat exchanges by conduction are not substantial primarily because the areas of contact between sheets 19 and stiffener 21 and between stiffener 21 and reflector 22 are kept to a minimum.

Mica sheets 19, which are practically transparent to infrared radiation, allow the resistive ribbons to radiate freely in all directions, notably in the direction toward toasting chamber 12. As the temperature of the air increases, there are created convection currents in spaces 32 that tend to equalize the temperature of the hot air therein with the surrounding atmosphere. On the other hand, the temperature increases significantly in toasting chamber 12.

Stiffener 21, the material of which is chosen for its reflectivity properties, returns a large part of the radiation toward the toasting chamber, through associated mica sheet 19, thus further increasing the temperature within chamber 12 while helping to insulate the chamber from the outside. The insulation is further improved by the form of the stiffener that presents small volumes or cells of still air that oppose convection and thus limit thermal transfers.

All of this leads to a heating of stiffener 21 which in its turn radiates in all directions. At the side toward chamber 12, this radiation combines with the radiation that is directly reflected. At the side toward case 2, the radiation reaches second reflector 22, which thus isolates case 2 from the induced radiation. But second reflector 22 also provides a closed volume constituted by second space 28 forming a layer of air between itself and stiffener 21, thus further limiting heat transfer by convection.

A final layer of air is formed by third space 32 between case 2 and each reflector 22. This layer is cooled by a circulation of air made possible by the form of base 3 and outer case 2 and by the height of second reflector 22. This air is drawn in, for example in the direction of arrow A in FIG. 2, by the chimney effect between base 3 and slot 11, due to the aspiration provoked by the outflow of hot air at the top. By making the cross-section between each opening 34 in base 2 and the outlet passage at the top of the toaster as constant as possible, an optimum air flow is assured. This permits effective cooling of outer case 2 and promotes evacuation of warm air toward the top and toward the center of the toaster.

Thus, outer case 2 is maintained at temperatures that provide a great deal of safety in the event that case 2 should be contacted by the user, while providing a toaster having a reduced size, and while limiting the fabrication costs. Correspondingly, there is an increase in the energy efficiency in toasting chamber 12 due to a better control of undesired heat dissipations.

A toaster having the form described above has been constructed and tested to confirm the existence of the desired good insulation. Toasting cycles with the toaster empty were carried out, each cycle having a duration of about 60 seconds of heating followed by around 30 seconds of cooling. Stabilized temperatures of the order of 70° C. maximum at the exterior of plastic case 2 with a heating power of 1250 W were obtained after 10 such cycles. In this example, the overall width of the toaster is of the order of 85 mm. Even at a temperature of 70° C., touching the case will not cause discomfort or burns because of the thermal effusion characteristics of plastic.

In modified embodiments of the invention, the number of toasting chambers 12 could be varied, as could the number of heating elements. The configuration, number and arrangement of projections 24 and protuberances 29 can equally be varied.

Figure 7:
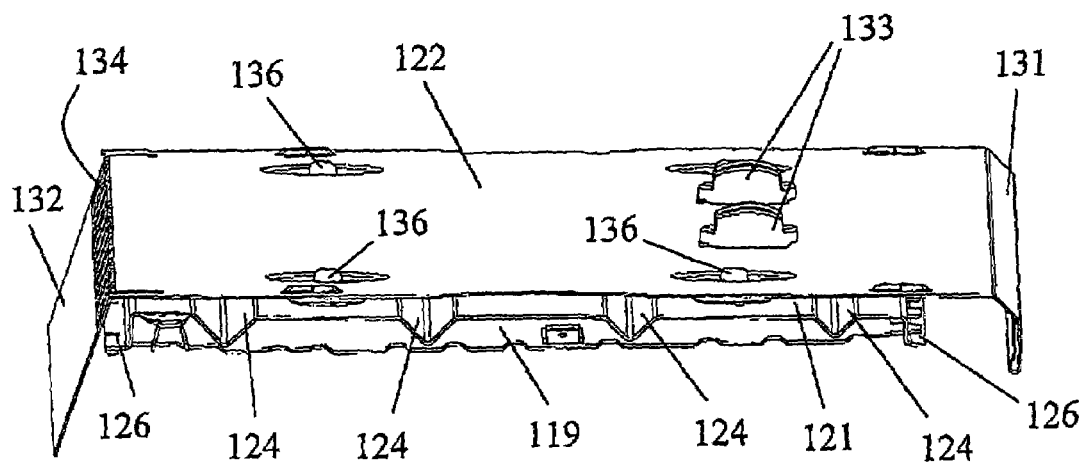
FIG. 7 is a perspective view of a heating element according to a second embodiment of the invention.
Figure 8:
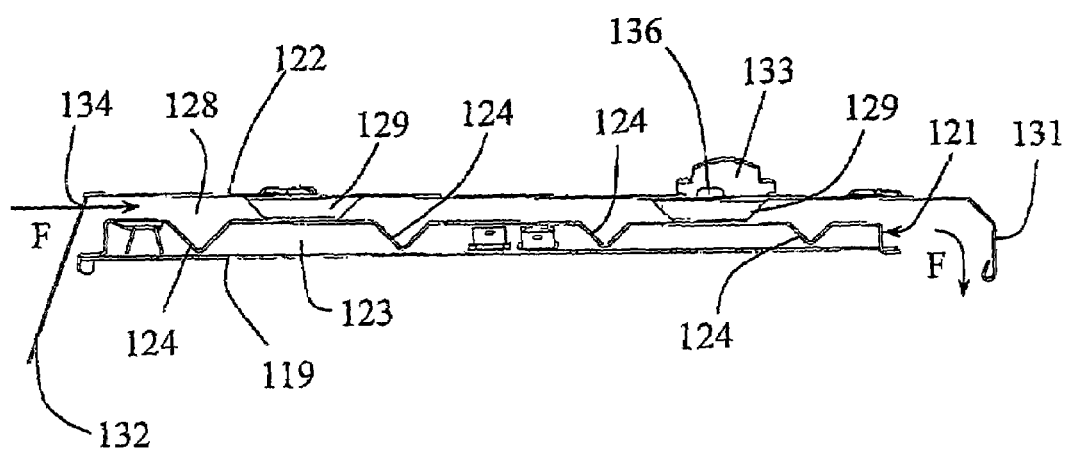
FIG. 8 is a side view of the heating element shown in FIG. 7.

FIGS. 7 and 8 show a second embodiment, particularly of the second reflector. In this embodiment, a support device 121 interposed between a mica sheet 119 and a second reflector 122 is provided with four projections 124, each having the form of a V-shaped bend in the sheet constituting support device 121. The apex of each projection 124 is in contact with mica sheet 119, assuring good mechanical support for sheet 119 while limiting, by the form of the contact areas, heat transfer by conduction.

Projections 124 determine the dimensions of the first space 123. In addition, support device, or stiffener, 121 also has two longitudinal edges 126 that are formed to anchor mica sheet 119 in place and to close the sides of space 123.

In this form of construction, second reflector 122 is separated from stiffener 121 by a second space 128 whose thickness is determined by four protuberances 129 in the form of conic frusta extending from the front face of reflector 122 and coming into contact with the rear face of stiffener 121. Second reflector 122 has two longitudinal edges 131, 132 extending from its front face and oriented toward stiffener 121. Edges 131,132 differ in form from edges 31 of second reflector 22 shown in FIG. 2–6. One difference involves the provision of openings 134 in edge 132, which is located at the bottom of the toaster, for the admission of air through edge 132. Openings 134 thus communicate with second space 128.

In the form of construction shown in FIGS. 7 and 8, second space 128 is not closed since longitudinal edges 131,132 do not rest on edges 126 of stiffener 121.

Retention of second reflector 122 in position relative to stiffener 121 is assured by attachment feet 136 that extend from stiffener 121 and pass through openings provided in the centers of protuberances 129 of second reflector 122.

The third space separating reflector 122 from the exterior case is defined by two spacers 133 extending from the rear face of second reflector 122 and coming in contact with the inner face of the outer case of the toaster.

Operation of a toaster equipped with heating elements and thermal isolation of these heating elements with the form of construction shown in FIGS. 7 and 8 is substantially identical to that of the toaster shown in FIGS. 1–6. However, in the form of construction shown in FIGS. 7 and 8, second space 128 is not a closed air space, but, to the contrary, allows for circulation of air from openings 134 in lower edge 132 to the level of upper edge 131, as represented by arrows F in FIG. 8.

Depending on the configuration and the power level of the heating elements, it can be preferable to create such an air circulation in the second space, rather than to create dead air cells.

This application relates to subject matter disclosed in French Application number FR-03 02042, filed on Feb. 19, 2003, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A heating element comprising:
   at least one mica sheet and a heating ribbon, or strip, mounted on said sheet;
   a support device in the form of a substantially flat plate holding said mica sheet and constituting a first reflector; and
   a plate secured to said support device and constituting a second reflector.

2. The heating element of claim 1, wherein said support device is separated from said mica sheet by a first space.

3. The heating element of claim 2, wherein said support device has at least one projection coming in contact with said mica sheet and defining the thickness of the first space.

4. The heating element of claim 3, wherein said projection is in the form of a longitudinal rib that creates at least two distinct substantially closed volumes situated at the interior of said first space.

5. The heating element of claim 2, wherein said plate is separated from said support device by a second space.

6. The heating element of claim 5, wherein said plate has at least one projecting part that comes in contact with said support device to define the thickness of said second space and to form a substantially closed volume within said second space.

7. The heating element of claim 5, wherein said plate has at least one air inlet opening that communicates with said second space.

8. The heating element of claim 1, wherein at least one of said support device and said plate is made of stamped and bent sheet metal.

9. The heating element of claim 1, wherein at least one of said support device and said plate has a surface that is treated to have good heat reflection properties.

10. An electric toaster comprising: a base; a case having an upper end; a toasting chamber disposed in said case and having an opening in the form of a slot at said upper end for the introduction and removal of bread; a movable bread support rack in said chamber; and at least one substantially vertical heating element as defined in claim 1.

11. The electric toaster of claim 10, wherein said case is separated from said plate of said heating element by a space that forms an open volume at the level of said upper end directed toward said slot.

12. The electric toaster of claim 11, wherein said plate has at least one spacer that comes in contact with said case.

13. The electric toaster of claim 12, wherein said base has at least one air inlet opening that communicates with said space.

14. The electric toaster of claim 11, wherein said base has at least one air inlet opening that communicates with said space.

15. The electric toaster of claim 10, wherein said plate has at least one spacer that comes in contact with said case.

16. The electric toaster of claim 10, wherein said support device of said heating element is interposed between said at least one mica sheet and said plate.

17. The heating element of claim 1, wherein said support device of said heating element is interposed between said at least one mica sheet and said plate.

* * * * *